United States Patent [19]

Chatfield et al.

[11] Patent Number: 5,153,030
[45] Date of Patent: Oct. 6, 1992

[54] CONTINUOUS TREATMENT PROCESS FOR PARTICULATE MATERIAL

[75] Inventors: John E. Chatfield, Decatur; Frederick L. Muller, Urbana, both of Ill.

[73] Assignee: Cabot Corporation, Boston, Mass.

[21] Appl. No.: 531,278

[22] Filed: Jul. 9, 1990

Related U.S. Application Data

[63] Continuation of Ser. No. 273,076, Nov. 18, 1988, abandoned.

[51] Int. Cl.$^5$ .......................... B05D 7/00; B05D 1/02
[52] U.S. Cl. .................................... 427/221; 427/215
[58] Field of Search ............... 118/303; 427/215, 216, 427/220-222

[56] References Cited

U.S. PATENT DOCUMENTS

| | | | |
|---|---|---|---|
| 3,991,225 | 11/1976 | Blouin | 427/215 X |
| 4,259,911 | 4/1981 | Jones | 110/106 X |
| 4,303,702 | 12/1981 | Bullock, Jr. et al. | 427/220 |
| 4,439,072 | 3/1984 | Goedken | 406/91 |
| 4,511,603 | 4/1985 | Wallace | 427/222 |
| 4,780,108 | 10/1988 | Razzano | 106/490 X |
| 4,794,022 | 12/1988 | Johnson et al. | 118/303 X |
| 4,921,674 | 5/1990 | Enos | 118/303 X |

FOREIGN PATENT DOCUMENTS 1025694 4/1966 United Kingdom ................ 427/222

OTHER PUBLICATIONS

"Diaphragm pump ... powder", Witden Pump product literature reprinted from Chemical Processing, Dec. 1976.

Technical bulletin on Wilden Air-Operated Double-Diaphragm Pumps, Colton, Calif., Wilden Pump & Engineering Co., Dec. 1988.

Degussa technical bulletin No. 28 on pigments, pp. 8-9 and 11-12 (undated).

Perry, R. H. and Chilton, C. H., "Chemical Engineers' Handbook", fifth edition, New York, McGraw-Hill Book Company, 1969, p. 7-5.

"Handbook of Chemistry and Physics," 47th edition, Cleveland, Ohio, The Chemical Rubber Co., 1966, p. F-1.

Fluidization and Fluid Particle Systems, by F. A. Zenz and D. F. Othmer, 1960, pp. 230-231, 346-379, 476-479 and 484-486.

*Primary Examiner*—Evan Lawrence

[57] ABSTRACT

A process for continuously producing a treating agent contacted particulate material having a bulk density of about 10 lbs./cu. ft. or less comprising contacting the material with a treating agent as the material is being transferred in dense phases from a storage container to a vessel. The material may be heated after contact if necessary.

14 Claims, 1 Drawing Sheet

CONTINUOUS TREATMENT PROCESS FOR PARTICULATE MATERIAL

This is a continuation of copending application Ser. No. 07/273,076 filed on Nov. 18, 1988, now abandoned.

BACKGROUND OF THE INVENTION

1. Field of the Invention

The present invention relates to a method for treating particulate material having a bulk density of about 10 lbs./cu. ft. or less with the treating agent in a continuous manner. More particularly the present invention relates to a method comprising contacting the material having a bulk density of about 10 lbs./cu. ft. or less with the treating agent as the material is being transferred into a vessel and heating the treating agent contacted material in the vessel if necessary.

2. Background

Materials having a bulk density of about 10 lbs./cu. ft. or less are commonly employed as fillers or reinforcing agents to improve the physical properties of compositions including rubbers, coatings, adhesives, paints, and sealants. Examples of these materials include, but are not limited to, fumed silicas, precipitated silicas, fumed aluminas, carbon blacks, and aerogels It is often desirable to treat these materials having a bulk density of 10 lbs./cu. ft. or less to change their properties to render them more suitable for a particular purpose. Generally known treating agents include, but are not limited to, liquids, vapors, atomized liquids, particulate solids etc. Generally, materials having a bulk density of about 10 lbs./cu. ft. or less are treated with a treating agent in a ratio of about 1-5 parts, by weight, material, to 1 part, by weight, treating agent.

For example, for many applications it is desirable to employ a hydrophobic filler or reinforcing agent. Thus if the material having a bulk density of about 10 lbs./cu. ft. or less is normally hydrophilic, it must be treated to be made hydrophobic. As previously discussed, generally hydrophilic materials having a bulk density of 10 lbs./cu. ft. or less are treated with treating agents to make them hydrophobic. Examples of these treating agents include, but are not limited to, silicone oils, silane oils, dimethylsiloxane oils, and hydrogen fluoride vapors.

Generally about 1-5 parts, by weight, of the material having a bulk density of 10 lbs./cu. ft. or less are treated with 1 part, by weight, treating agent. For example, in an embodiment of the present invention for treating fumed silica with a silane oil, about 2-5 parts by weight fumed silica are treated with 1 part, by weight, silane oil.

As previously discussed, one example of a material having a bulk density of 10 lbs./cu. ft. or less is fumed silica. This material, also known as pyrogenic silica, is a well known reinforcing agent or filler commonly employed to improve the physical properties of compositions including silicone rubbers, coatings, adhesives, and sealants. Fumed silica basically comprises finely divided silicon dioxide particles and generally has a bulk density of about 5 lbs./cu.ft. or less and a surface area generally between about 50-400 sq.m/g.

Another example of a material having a bulk density of 10 lbs./cu. ft. or less is precipitated silica. Precipitated silica is also a well known reinforcing agent or filler commonly employed to improve the physical properties of compositions including silicone rubbers, coatings, adhesives, and sealants. Precipitated silica basically comprises finely divided silicon dioxide particles and generally has a bulk density of about 10 lbs./cu. ft. or less. For certain applications it is desirable to employ hydrophobic fumed silicas. Generally hydrophilic fumed silica is made hydrophobic by treating the hydrophilic fumed silica with a treating agent. For example U.S. Pat. No. 4,307,023 to Ettlinger et. al. discloses treating fumed silica with organosilicon compounds such as silicone oils to make the fumed silica hydrophobic and U.S. Pat. No. 4,054,689 to Calvin discloses treating fumed silica with hydrogen fluoride vapors to make the fumed silica hydrophobic. Heat may be required to facilitate a reaction between the fumed silica and the treating agent.

Generally the fumed silica is treated in a batch-type process in a vessel by filling the vessel with fumed silica and then contacting the fumed silica with a treating agent. This method is disclosed in U.S. Pat. No. 4,307,023. Mechanical mixing means may be employed to mix the fumed silica and the treating agent. The vessel may also be heated during this process. A similar process is also disclosed in U.S. Pat. No. 4,780,108 to Razzano which discloses placing a low bulk density material in a mixing vessel and then spraying a treating agent onto the material while it is being turbulently mixed. A batch-type method is also disclosed in U.S. Pat. No. 4,054,689 although in the method disclosed in U.S. Pat. No. 4,054,689 the treating agent may be added to the vessel before the fumed silica.

However these methods for treating a material having a bulk density of about 10 lbs./cu. ft. or less with a treating agent by contacting the material with the treating agent in a vessel have many disadvantages. First these methods are not continuous. To maintain the desired ratio of the material having a bulk density of about 10 lbs./cu. ft. or less to treating agent a fixed amount of both must be added to the vessel. Then the final product must be completely removed from the vessel and the vessel cleaned. Then the process starts over again with new quantities of material having a bulk density of about 10 lbs./cu. ft. or less and treating agent.

Another disadvantage with the generally employed methods is that the means for adding the treating agent to the vessel frequently clog. For example, generally the treating agent is added to the vessel through injection means or other openings at the end of a pipe or pipes. These injection means or openings can become clogged by the material having a bulk density of about 10 lbs./cu. ft. or less and therefore require frequent cleaning.

Further, in view of the fact that generally known processes are batch-type processes, there is a tendency for the treating agent to ball up in the vessel or collect on the injection means or opening. Both the injection means or opening and the vessel must therefore be cleaned to remove the treating agent balls and collected treating agent.

Also, if the vessel is heated, the treating agent balls and/or the treating agent collected on the nozzle or opening can cause fires in the vessel. These fires may also occur if excess treating agent is not thoroughly cleaned from the vessel.

Another problem with treating a material having a bulk density of about 10 lbs./cu. ft. or less with a treating agent by contacting the material with the treating agent in a vessel is ensuring all of the material is contacted by the treating agent. As previously discussed, mechanical mixing means are often employed to attempt to thoroughly contact all the material having a bulk density of about 10 lbs./cu. ft. or less with the treating agent. However, because of its density, a material having a bulk density of about 10 lbs./cu. ft. or less is difficult to move and/or agitate by mechanical means. Therefore the material located closer to the point where the treating agent is added will tend to be contacted with too much of the treating agent. Conversely, the material located further away from the point where the treating agent is added will tend to be contacted with too little treating agent. Both the "over-contacted" material and the uncontacted material end up lowering the final product's quality.

Accordingly, one object of the present invention is to overcome the disadvantages of known methods for treating a material having a bulk density of about 10 lbs./cu. ft. or less with a treating agent.

Another object of the present invention is to provide a continuous method for treating a material having a bulk density of about 10 lbs./cu. ft. or less with a treating agent.

A further object of the present invention is to provide a method for treating a material having a bulk density of about 10 lbs./cu. ft. or less with a treating agent which substantially reduces the chances of fires. A still further object of the present invention is to provide a method for treating a material having a bulk density of about 10 lbs./cu. ft. or less with a treating agent in which the material is uniformly and thoroughly contacted by the treating agent.

A still further object of the present invention is to provide a method for treating a material having a bulk density of about 10 lbs./cu. ft. or less with a treating agent which does not require frequent cleaning of the means for treating.

Other objects and advantages of the present invention will become apparent in the following description of the invention.

SUMMARY OF THE INVENTION

According to the present invention a material having a bulk density of about 10 lbs./cu. ft. or less is treated with a treating agent by contacting the material with the treating agent in a continuous manner as the material is being transferred between a storage container and a vessel. The contacted material may be heated in the vessel if necessary.

A major advantage of the present invention is that the material having a bulk density of about 10 lbs./cu. ft. or less may be continuously treated with the treating agent.

Another advantage of the present invention is that the chance of fire in the vessel is considerably reduced.

A further advantage of the present invention is that the material having a bulk density of about 10 lbs./cu. ft. or less is evenly and uniformly contacted by the treating agent.

A still further advantage of the present invention is that the vessel requires less frequent cleaning than in heretofore utilized treating methods.

Other advantages of the present invention will become apparent from the following more detailed description of the invention.

DETAILED DESCRIPTION OF THE INVENTION

Figure 1:
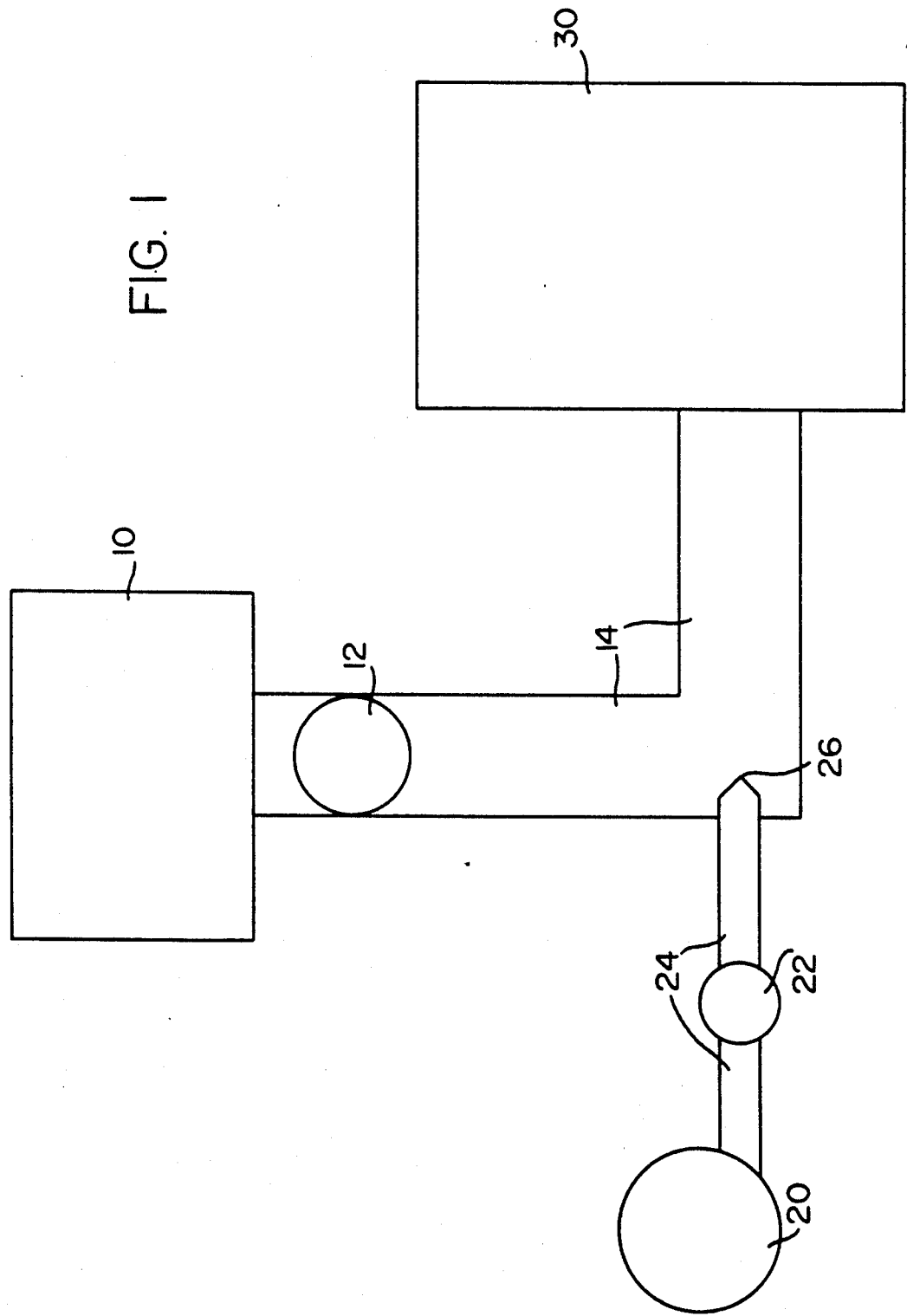
FIG. 1 is a schematic of an embodiment of the present invention.

An embodiment of the present invention is shown in FIG. 1. A material having a bulk density of about 10 lbs./cu. ft. or less is stored in container 10 and a treating agent is stored in container 20. Pump 12 continuously pumps the material having a bulk density of about 10 lbs./cu. ft. or less through pipe 14 in dense phase so that the bulk density of the material in the pipe is about 10 lbs./cu. ft. or less. At the same time pump 22 is pumping the treating agent through pipe 24, and injection means 26, into pipe 14 where the treating agent contacts the material having a bulk density of about 10 lbs./cu. ft. or less. If desired the treating agent may be heated in storage container 20 or pipe 24. The treating agent contacted material continues to flow through pipe 14 into vessel 30. If necessary vessel 30 may be heated to finish the treatment of the material having a bulk density of about 10 lbs./cu. ft. or less with the treating agent. Injection means 26 are utilized to uniformly distribute the treating agent throughout pipe 14 and therefore to uniformly contact the material having a bulk density of about 10 lbs./cu. ft. or less with the treating agent. In the embodiment depicted in FIG. 1 the treating agent is added in substantially the same direction as the direction of flow of the material having a bulk density of about 10 lbs./cu. ft. or less through pipe 14. Also in the embodiment depicted in FIG. 1, pipe 24 communicates with pipe 14 at an approximately 90 degree bend in pipe 14 and protrudes slightly into the interior of pipe 14 so that injection means 26 are located away from the side wall of pipe 14. As will be readily apparent to one skilled in the art, the location of injection means 26 in pipe 14 and the location of pipe 24's communication with pipe 14 may be varied to produce optimal contact between the particular material having a bulk density of about 10 lbs./cu. ft. or less being treated and the particular treating agent being used to treat the material. Similarly, the direction in which the treating agent is added may be varied.

The present invention is well suited for treating fumed silica with a silane oil, such as polydimethylsiloxane, to make the fumed silica hydrophobic. Fumed silica is stored in container 10 and silane oil is stored in container 20. Pump 12 is a conventional diaphragm pump and pump 22 is a conventional pump. Vessel 30 is heated to a temperature sufficient to render fumed silica product hydrophobic. To begin the process pumps 20 and 22 are started. Fumed silica is thereby pumped from container 10 through pipe 14 where it is contacted by the silane oil pumped through pipe 24 and into pipe 14 through injection means 26. If desired the silane oil may be heated in either storage container 20 or pipe 24. The fumed silica and the silane oil are pumped at different rates so that the final overall ratio of fumed silica to silane oil is about 2 to 1 by weight or greater. After being contacted with the silane oil the contacted fumed silica continues to flow through pipe 14 into vessel 30. The present invention may be utilized in a similar manner to treat precipitated silicas, fumed aluminas, carbon blacks or aerogels Numerous variations and modifications may obviously be made in the process herein described without departing from the present invention. Accordingly, it should be clearly understood that the forms of the invention herein described and shown in the accompanying drawing are illustrative only and are not intended to limit the scope of the invention. The present invention includes all modifications falling within the scope of the following claims.

We claim:

1. A process comprising: continuously contacting a particulate material having a bulk density of about 10 lbs./cu.ft. or less with a treating agent while said material is being transferred by pipe in dense phase from a storage container to a vessel, wherein said contacting comprises using injecting means located in the interior of said pipe.

2. The process of claim 1 further comprising heating said material after said treating agent contact.

3. The process of claim 1 wherein said injecting means comprises means for spraying said material with said treating agent.

4. The process of claim 3 wherein said spraying means further comprises means for injecting said treating agent in substantially the same direction as the direction of travel of said material being transferred.

5. The process of claim 3 wherein said injecting means are located at an approximately 90 degree bend in said pipe.

6. The process of claim 1 wherein said ratio, by weight, of said material to said treating agent is about 1:1 to 5:1.

7. The process of claim 1 wherein said material comprises a fumed silica.

8. The process of claim 7 wherein said treating agent comprises a silane oil.

9. The process of claim 8 wherein said silane oil comprises polydimethylsiloxane.

10. The process of claim 8 wherein the ratio, by weight, of fumed silica to silane oil is about 2:1 to 5:1.

11. The process of claim 8 wherein said silane oil is heated before contacting said material.

12. The process of claim 1 wherein said material is hydrophilic before contact with said treating agent and hydrophobic after contact with said treating agent.

13. A process comprising: continuously contacting a particulate material having a bulk density of about 10 lbs./cu.ft. or less with a liquid while said material is being transferred by pipe in dense phase from a storage container to a vessel, wherein said contacting comprises using injecting means located in the interior of said pipe.

14. The process of claim 13 wherein said material is hydrophilic before contact with said liquid and hydrophobic after contact with said liquid.

* * * * *